Figure 1:
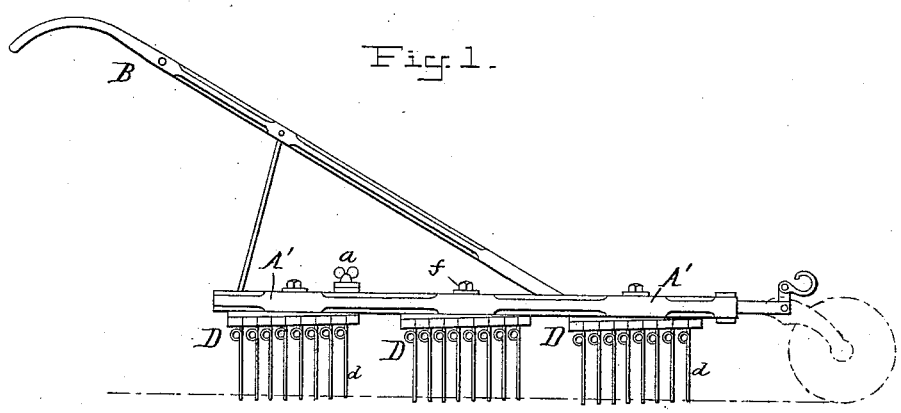

(No Model.)
2 Sheets—Sheet 1.

V. H. HALLOCK.
WEEDING MACHINE.

No. 444,609. Patented Jan. 13, 1891.

WITNESSES:
E. J. Griswold
John Revell

INVENTOR
Valentine H. Hallock
BY
Howson and Howson
his ATTORNEYS (No Model.) 2 Sheets—Sheet 2.

V. H. HALLOCK.
WEEDING MACHINE.

No. 444,609. Patented Jan. 13, 1891.

WITNESSES:
E. J. Griswold
John Revell

INVENTOR
Valentine H. Hallock
BY
Howson and Howson
his ATTORNEYS

UNITED STATES PATENT OFFICE.

VALENTINE H. HALLOCK, OF QUEENS, NEW YORK.

WEEDING-MACHINE.

SPECIFICATION forming part of Letters Patent No. 444,609, dated January 13, 1891.

Application filed February 14, 1890. Serial No. 340,396. (No model.)

*To all whom it may concern:*

Be it known that I, VALENTINE H. HALLOCK, a citizen of the United States, and a resident of Queens, Queens county, Long Island, State of New York, have invented an Improved Weeding-Machine, of which the following is a specification.

In the cultivation of all root crops—such as cotton, corn, flower-bulbs, strawberries, cabbages, turnips, &c.—it is of primary importance that the land should be carefully weeded around the plants while they are still young, so that the plants may have unrestrained opportunities of spreading their roots and getting all needed nourishment from the soil. It is to be borne in mind that it is not the part of the weed which appears above the ground that interferes materially with the growth of the plants under cultivation; but it is the roots of the weeds spreading through the soil and getting from the latter its nourishment that interferes with the growth and cultivation of the plants. Any attempt to get rid of the weeds by running an ordinary plow, harrow, or cultivator between the rows of plants meets with indifferent success in its ultimate object, because the cultivator, harrow, or plow cuts so far into the ground that on the one hand it cuts the spreading roots of the plants as well as the weeds and so damages the plants and on the other hand brings up toward the surface weed-seeds which had before been buried too far down to grow. Consequently in addition to the damaging of the plants by cutting their roots new weeds will spring up again from the turned-up seeds. With these facts in mind I have devised a weeding-machine which is intended to be run between the rows of growing plants while the latter and the weeds are still quite young and before the weeds have spread at their roots to any great extent.

My improved weeder has as its characteristic feature an acting surface composed solely of a multiplicity of spring-teeth, like a spring-tooth curry-comb, and as this is traversed between the rows the rebounding of the innumerable spring-teeth causes the tearing out of the young weeds and the tearing of them to pieces, so as to practically kill them, while at the same time the ends of the spring-teeth do not, and indeed cannot, go so far into the ground as to bring up fresh weed-seed or interfere with the spreading roots of the plants under cultivation, even if the weeder be driven close to the rows of young plants. The rebounding and striking of the spring-teeth upon the weeds and upon the soil at the surface of the ground as the weeding-machine is traversed between the rows not only tears up and destroys the young weeds but triturates the soil at the surface and loosens it up. By this loosening of the surface soil the capillary attraction by which moisture is drawn from the ground below under the hot sun is lessened.

The characteristic features of my improved weeder, which I will term a "curry-comb" weeder, may be embodied in machines of various constructions; but in the drawings I have illustrated the weeder as constructed, so far as the frame is concerned, like an ordinary cultivator.

Figure 2:
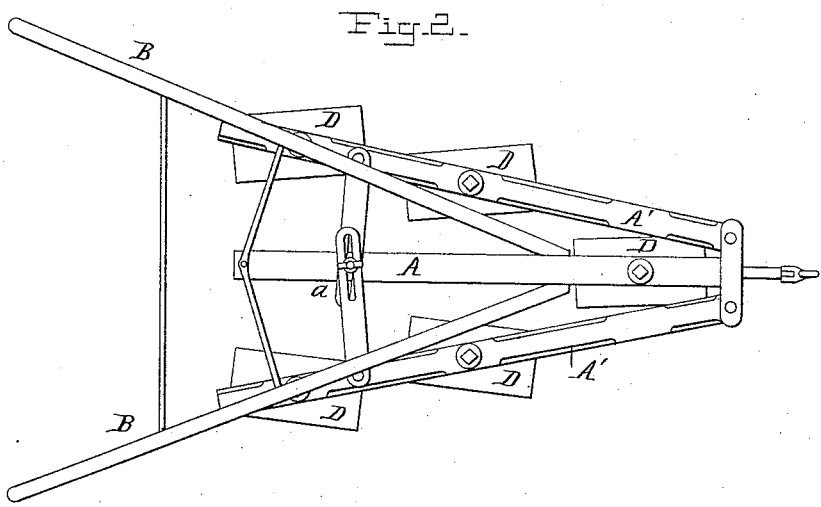
Figure 3:
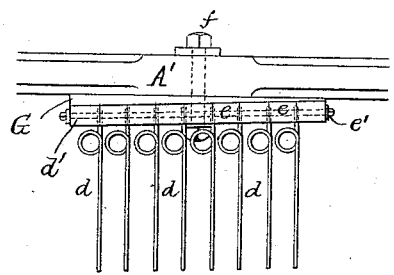
Figure 4:
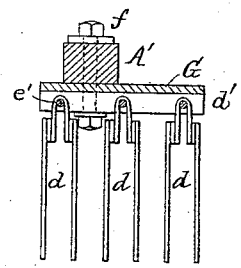
Figure 5:
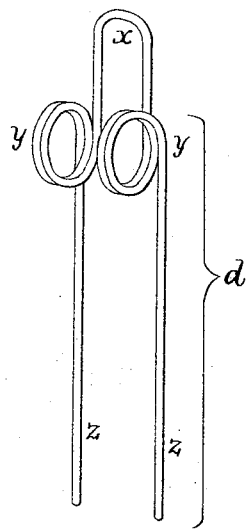

In the drawings, Figure 1 is a side view of such a weeding-machine. Fig. 2 is a plan view of the same. Fig. 3 is a side view, drawn to a larger scale, of one of the brush-blocks attached to a part of the frame. Fig. 4 is a transverse section of the same. Fig. 5 is an enlarged perspective view of a preferred form of spring-tooth.

The frame shown in the drawings and particularly in Figs. 1 and 2 is a well-known form of cultivator-frame with the central bar A and the side bars A' hinged at the front of the central bar, so that they can be adjusted inward or outward at their rear ends and secured by suitable means, as at $a$, to cover a greater or less width of ground in passing between the rows. The frame is provided with handle-bars B and means by which a horse can be hitched to the forward end. It may also be provided with a front wheel, as indicated by dotted lines in Fig. 1. I set the spring-teeth closely together and arrange them in brush-like groups by mounting them on suitable-sized blocks D, and in Figs. 1 and 2 I have shown five such blocks as detachably secured to the under side of the frame, already described; but I do not wish to restrict myself to any particular construction of frame or to any number of such blocks of spring-teeth. The spring-teeth $d$ themselves are formed of tempered steel, and by preference they are constructed as shown in Fig. 5, two teeth being formed out of one piece of wire bent at the center into a loop, as shown at $x$, with two or three turns of a coil $y$ at right angles to the loop and the free ends $z$ of the wire extending down to a considerable distance below the coils to form the acting ends of the spring to tear and destroy the weeds and to triturate the ground. The spring-teeth formed in this or any other suitable way, may be secured by any convenient means to a wooden or other backing $d'$, thus forming the block of spring-teeth like a curry-comb, and which may be secured to a part of the frame by means of a bolt and nut $f$ or other suitable device. I prefer a single bolt or nut for the reason that it enables me to adjust the block in a rotary direction upon the bolt, so that I can not only have the successive blocks overlap each other in their action to various extents within certain limits, but I can also adjust the block to such a position that no two successive teeth will follow each other in the line of movement of the machine as it passes over the ground.

As a convenient way of constructing the curry-comb block described, I have illustrated the spring-teeth as having their upper ends or loops clamped between successive wooden strips $e$, forming the backing $d'$, and held together by longitudinal bolts $e'$, passing through the loops of the springs. In order that these blocks of spring-teeth when in action may not tend to brush down into the ground and tend to sweep everything forward continuously, I make the lower ends of the forward teeth of each block higher than the lower ends of the rear spring-teeth. As a convenient way of accomplishing this, I simply insert between the backing $d'$ of each block a wedge-shaped piece G, as shown in Fig. 3.

When the machine of the character described is passed down between the rows of young plants under cultivation and while the weeds are still young, (it will be preferable to use the machine as soon as the weeds begin to shoot up,) it will be readily seen that the young weeds by the rebounding of the multiplicity of spring-teeth covering the entire surface of the ground within the lines of the machine will be torn out of the ground and torn to pieces. Moreover, the multiplicity of these spring-teeth will not allow of their cutting into the ground to any such depth as is the case with cultivators, plows, or harrows, and in consequence the surface only of the ground will be triturated, none of the weed-seed in the ground below will be brought up or given a chance to spread its roots, and, furthermore, the roots of the young plants under cultivation will not be disturbed.

I claim as my invention—

1. A weeding-machine consisting of a frame having secured to its under side a number of separate blocks, each carrying a multiplicity of closely-set spring-teeth, said machine, with its blocks of spring-teeth, being adapted to be traversed between the rows of growing plants, substantially as described.

2. A weeding-machine consisting of a frame with fixed and adjustable bars having secured to their under sides separate detachable blocks, each carrying a multiplicity of closely-set spring-teeth, the machine being adapted to be traversed between the rows of growing plants, substantially as set forth.

3. A weeding-machine consisting of a frame and a series of blocks, each with a multiplicity of closely-set spring-teeth like a brush and with a bolt to secure the block to the frame, whereby the said block may be adjusted in a rotary direction about its securing-bolt, as and for the purpose set forth.

4. A weeding-machine consisting of a frame and a series of blocks, each with a multiplicity of spring-teeth and secured to the under side of the said frame, with the lower ends of the forward teeth higher than the lower ends of the rear teeth of each block, all substantially as and for the purpose set forth.

5. A curry-comb block for a weeding-machine, consisting of a backing with clamping-strips and fastening-bolts and a multiplicity of spring-teeth made in pairs, formed each pair with a central loop clamped between the strips, coils below the loop, and the two free ends forming the acting ends of the teeth, all substantially as described.

In testimony whereof I have signed my name to this specification in the presence of two subscribing witnesses.

VALENTINE H. HALLOCK.

Witnesses:
EDITH J. GRISWOLD,
JOHN REVELL.